(12) United States Patent
Chen et al.

(10) Patent No.: US 9,542,328 B2
(45) Date of Patent: Jan. 10, 2017

(54) DYNAMICALLY CONTROLLING A FILE SYSTEM WRITE CACHE

(71) Applicant: INTERNATIONAL BUSINESS MACHINES CORPORATION, Armonk, NY (US)

(72) Inventors: Lior Chen, Jerusalem (IL); Maxim Kalaev, Petach Tikva (IL); Amit Margalit, Hod-Hasharon (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 14/605,665

(22) Filed: Jan. 26, 2015

(65) Prior Publication Data

US 2016/0217078 A1    Jul. 28, 2016

(51) Int. Cl.
*G06F 12/08* (2016.01)
*G06F 12/12* (2016.01)
*G06F 12/10* (2016.01)

(52) U.S. Cl.
CPC ....... *G06F 12/0871* (2013.01); *G06F 12/0833* (2013.01); *G06F 12/1009* (2013.01); *G06F 12/12* (2013.01); *G06F 2212/6042* (2013.01); *G06F 2212/62* (2013.01); *G06F 2212/65* (2013.01); *G06F 2212/69* (2013.01)

(58) Field of Classification Search
CPC .. G06F 12/0871; G06F 12/0833; G06F 12/12; G06F 12/1009; G06F 2212/6042; G06F 2212/69; G06F 2212/65; G06F 2212/62
See application file for complete search history.

(56) References Cited

U.S. PATENT DOCUMENTS 5,226,141 A  *  7/1993  Esbensen ............ G06F 12/0866
                                                   711/111
7,177,983 B2    2/2007  Royer
(Continued)

OTHER PUBLICATIONS

Nelson et al., "Caching in the Sprite network file system," ACM Transactions on Computer Systems (TOCS) 6.1, Feb. 1988 (21 pages).

(Continued)

*Primary Examiner* — David X Yi
*Assistant Examiner* — Rocio Del Mar Perez-Velez
(74) *Attorney, Agent, or Firm* — Griffiths & Seaton PLLC

(57) ABSTRACT

Methods, computing systems and computer program products implement embodiments of the present invention that include initializing, by a processor executing a file system in communication with a block manager managing multiple storage regions on a storage device, a file system write cache to have a default cache size, the default cache size corresponding to a first storage capacity of a default number of the storage regions. Upon detecting that a current number of the storage regions that are not in use by the block manager is less than the default number, the file system write cache is resized to a reduced cache size that corresponds to a second storage capacity of the current number of the storage regions. While the file system write cache has the reduced cache size, the file system write cache can be resized back to the default cache size as unused storage regions become available.

17 Claims, 4 Drawing Sheets

(56) References Cited

U.S. PATENT DOCUMENTS

| | | |
|---|---|---|
| 7,640,410 B2 | 12/2009 | Zohar et al. |
| 7,702,857 B2 | 4/2010 | Gill et al. |
| 7,702,873 B2 | 4/2010 | Griess et al. |
| 8,626,866 B1 | 1/2014 | Lango et al. |
| 8,719,501 B2 | 5/2014 | Flynn et al. |
| 2007/0088532 A1* | 4/2007 | Alvarez ............... G05B 13/042 703/2 |
| 2009/0100237 A1 | 4/2009 | Orikasa et al. |
| 2012/0210066 A1 | 8/2012 | Joshi et al. |
| 2012/0311293 A1* | 12/2012 | Nemazie ............ G11C 16/0483 711/171 |
| 2013/0262811 A1 | 10/2013 | Taguchi |
| 2013/0346724 A1 | 12/2013 | Ranade et al. |

OTHER PUBLICATIONS

Van Hensbergen et al., "Dynamic policy disk caching for storage networking," URL: http://visa.cs.Fiu.edu/ming/dmcache, Nov. 28, 2006 (13 pages).

* cited by examiner

DYNAMICALLY CONTROLLING A FILE SYSTEM WRITE CACHE

FIELD OF THE INVENTION

The present invention relates generally to cache management, and specifically to dynamically controlling the size of a file system write cache.

BACKGROUND

Thin provisioning is a method used by storage systems to optimize utilization of available physical storage space. Instead of allocating all requested physical blocks (also known as storage regions) to data volumes (i.e., logical volumes) up front, thin provisioning implements on-demand allocation of the storage units to the data volumes. This methodology helps eliminate almost all "whitespace" (i.e., storage regions allocated to data volumes but not storing any data), thereby improving storage utilization rates over storage allocation methods such as thick provisioning that allocate, to individual data volumes, storage regions that may remain unused (i.e., not storing any data).

Thin provisioning implements an over-allocation (or over-subscription) mechanism that enables a storage system to view additional storage capacity than has been physically reserved on the storage system itself. In thin provisioning, physical storage space is either physical storage space or logical storage space, wherein the physical storage space is either reserved or used. Reserved physical storage space comprises an amount of storage space that is allocated to a storage pool, and used storage space comprises an amount of reserved physical storage space that is currently used to store data. For a given data volume, the logical space comprises the given volume's reported capacity, and for a given storage pool, the logical space comprises a maximum size for all data volumes in the pool.

Over-allocation enables flexibility in growth of data volumes, without having to predict accurately how much a given data volume will grow. Instead, storage region growth becomes sequential. Physical storage capacity in the storage system is only dedicated when data is actually written by a host computer, not when the storage volume is initially allocated. The servers, and by extension the applications that reside on them, view a full size data volume from the storage but the storage itself only allocates the blocks of data when they are written.

The description above is presented as a general overview of related art in this field and should not be construed as an admission that any of the information it contains constitutes prior art against the present patent application.

SUMMARY

There is provided, in accordance with an embodiment of the present invention a method, including initializing, by a processor executing a file system in communication with a block manager managing multiple storage regions on a storage device, a file system write cache to have a default cache size, the default cache size corresponding to a first storage capacity of a default number of the storage regions, determining a current number of the storage regions that are not in use by the block manager, and upon detecting that the current number is less than the default number, resizing the file system write cache to a reduced cache size that corresponds to a second storage capacity of the current number of the storage regions.

There is also provided, in accordance with an embodiment of the present invention an apparatus, including a storage device, a memory configured to store a file system write cache, and a processor configured to execute a block manager configured to manage multiple storage regions on the storage device, and to execute a file system manager configured to initialize the file system write cache to have a default cache size, the default cache size corresponding to a first storage capacity of a default number of the storage regions, to determine a current number of the storage regions that are not in use by the block manager, and upon detecting that the current number is less than the default number, to resize the file system write cache to a reduced cache size that corresponds to a second storage capacity of the current number of the storage regions.

There is further provided, in accordance with an embodiment of the present invention a computer program product, the computer program product including a non-transitory computer readable storage medium having computer readable program code embodied therewith, the computer readable program code including computer readable program code configured to initialize, by a processor executing a file system in communication with a block manager managing multiple storage regions on a storage device, a file system write cache to have a default cache size, the default cache size corresponding to a first storage capacity of a default number of the storage regions, computer readable program code configured to determine a current number of the storage regions that are not in use by the block manage, and computer readable program code configured upon detecting that the current number is less than the default number, to resize the file system write cache to a reduced cache size that corresponds to a second storage capacity of the current number of the storage regions.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
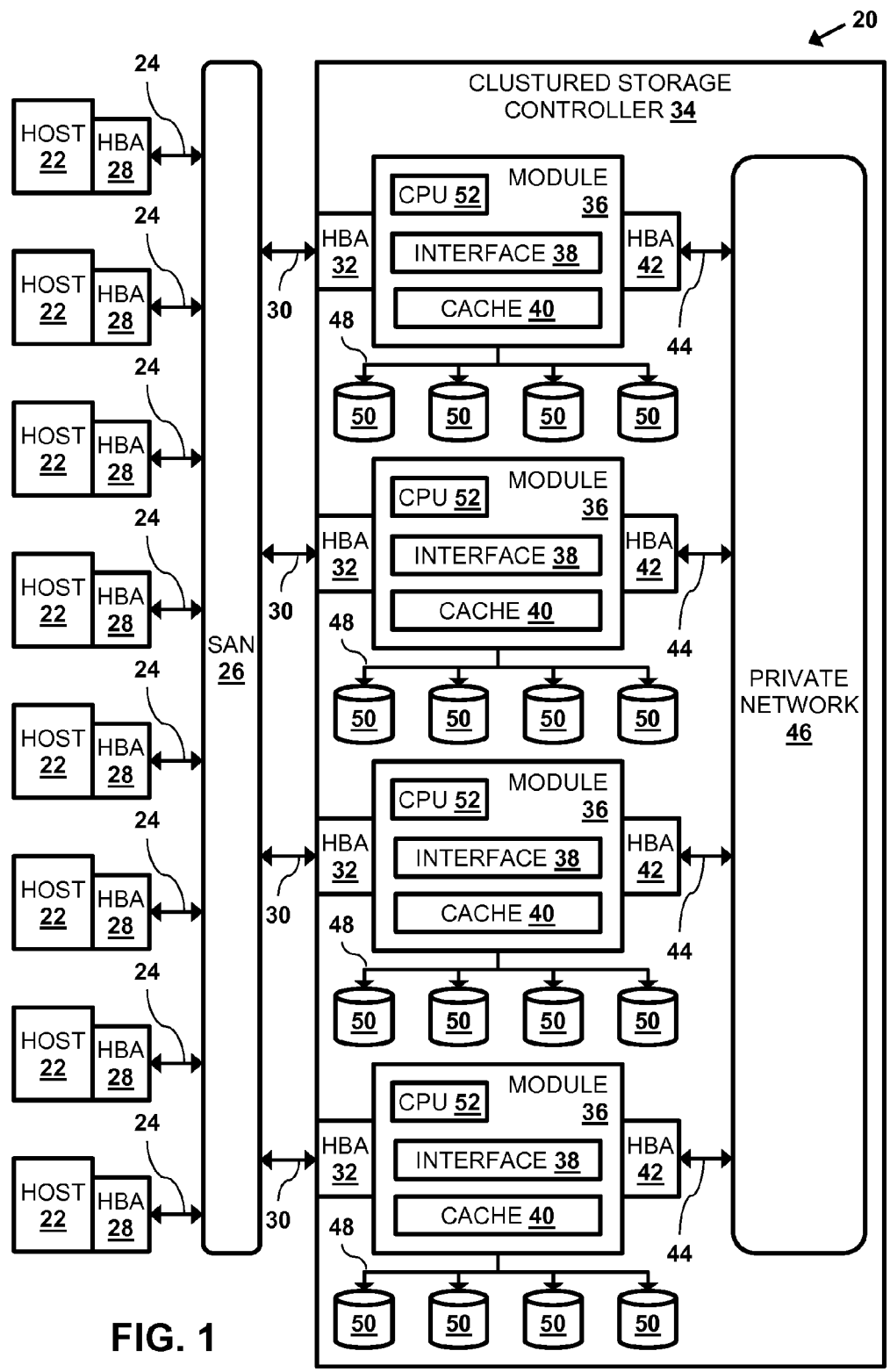
FIG. 1 is a block diagram that schematically illustrates a storage system comprising a storage controller and multiple host computers, in accordance with an embodiment of the present invention.

An example of a storage facility implementing thin provisioning comprises a storage system having multiple storage devices and a host computer that communicate via a network. The storage system can execute a block manager and the host computer can execute a file system manager (also referred to herein simply as a file system). The block manager is configured to map logical volumes to storage regions (also known as blocks) on the storage devices, and the file system manager is configured to map files to the logical volumes. In operation, the block manager manages physical storage regions, and the file system manager manages logical storage regions.

Additionally, the file system manager typically manages a file system write cache, and confirms data write requests asynchronously. In other words, when the host computer receives a data write request from a client computer, the host computer will typically confirm the data write request upon storing the data to the file system write cache. In storage facilities implementing thin provisioning, the file system typically manages a greater number of logical storage regions than the number of physical storage regions managed by the block manager. Therefore, since the file system operates asynchronously, the file system can confirm the write operation even if there are not enough physical regions available to destage the data from the cache.

Embodiments of the present invention provide methods and systems for dynamically adjusting a size of the file system write cache based on the number of available physical storage regions. As explained hereinbelow, the file system write cache is initialized to have a default cache size that corresponds to a first storage capacity of a default number of the physical storage regions. While processing storage commands, a current number of the physical storage regions that are not in use by the block manager is determined, and upon detecting that the current number is less than the default number, the file system write cache is resized to a reduced cache size that corresponds to a second storage capacity of the current number of the storage regions. In some embodiments, the file system can "grow" the cache back to the default cache size as physical storage regions become available to the block manager.

When there are no more available physical storage regions, the cache size is zero, and the file system operates in synchronous mode. If the file system receives a data write request while operating in synchronous mode, the file conveys the data write request to the block manager, and confirms completion of the data write request only upon receiving a completion confirmation from the block manager.

Therefore, systems implementing embodiments of the present invention ensure that the file system does not asynchronously confirm completion of data write requests when there are insufficient physical storage regions available to process the data write request. In other words, if there are insufficient storage regions to complete a given data write request, embodiments of the present invention enable the file system to synchronously generate an insufficient space error.

In addition to implementing dynamic file system write cache resizing in systems implementing thin provisioning, embodiments of the present invention can be used to dynamically resize file system write caches in systems implementing logical volume compression. Similar to thin provisioning, systems implementing volume compression can provide more logical storage than the available number of storage regions, since compression may enable larger amounts of data to be written to a given logical storage region. Systems implementing volume compression typically perform well as long as there is a plenty of free physical space on the system. However, as the free physical space depletes (e.g., if non-compressible data was written by users, or if all the volumes are full), the system may have to start failing input/output (I/O) requests. Therefore systems having compressed volumes that implementing embodiments of the present invention can ensure graceful recovery as available physical storage space declines to the point that I/O requests can no longer be completed.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a storage central processing unit (CPU) 52 (also referred to herein as a storage processor 52), an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four storage modules 36 and each of the modules coupled to four storage devices 50, a given storage controller 34 comprising any multiple of storage modules 36 coupled to any plurality of storage devices 50 is considered to be with the spirit and scope of the present invention.

Figure 2:
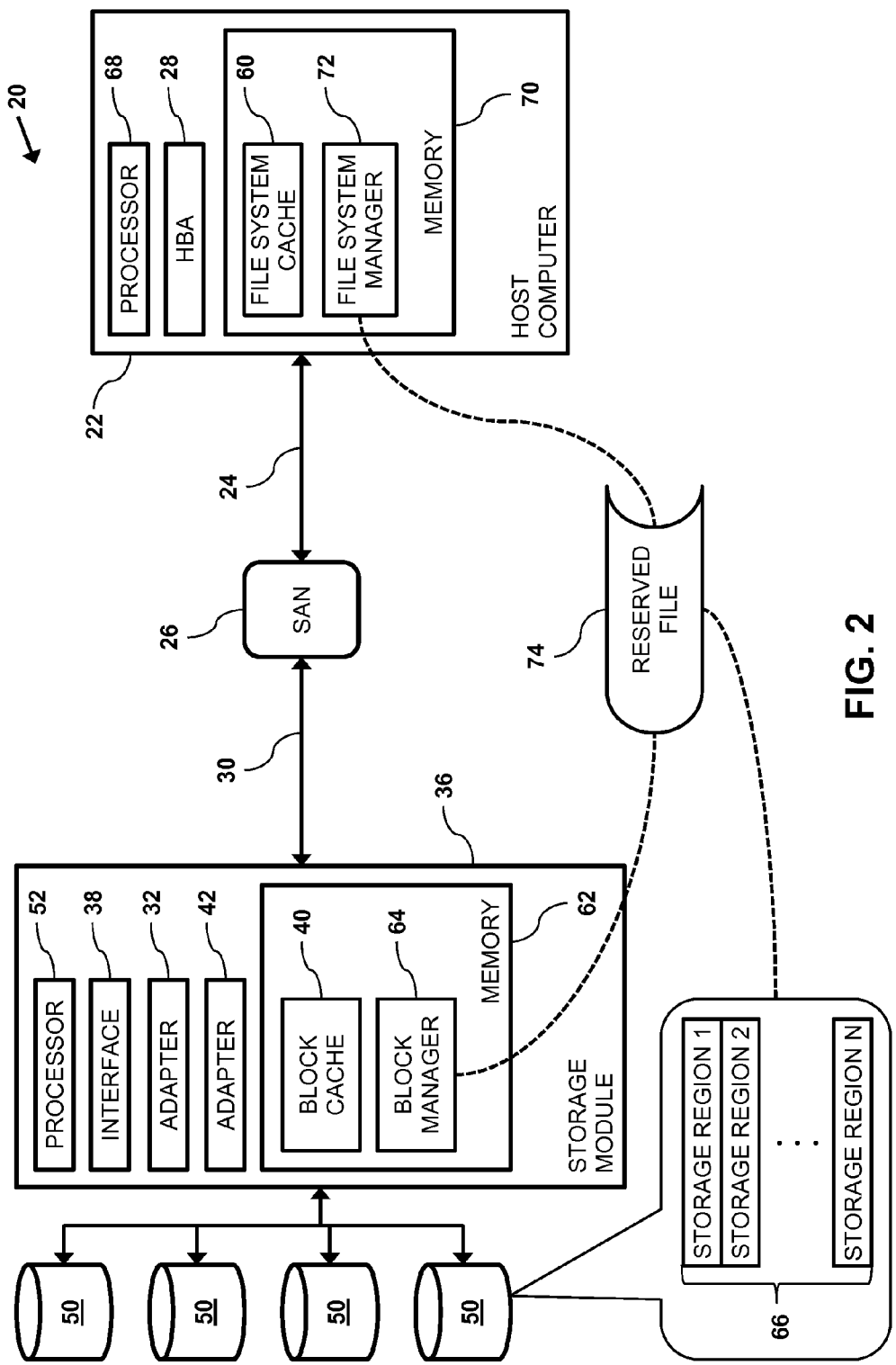
FIG. 2 is a block diagram that schematically illustrates software and hardware elements of the storage controller and a given host computer that is configured to dynamically control a size of a file system write cache, in accordance with an embodiment of the present invention.

FIG. 2 is a block diagram that schematically illustrates software and hardware elements of storage controller 34 and a given host computer 22 that are configured to dynamically control a size of a file system write cache 60, in accordance with an embodiment of the present invention. In addition to storage processor 52, interface 38 and adapters 32 and 42, each module 36 comprises a memory 62 that is configured to store cache 40 (also referred to herein as block cache 40) and a block manager application 64. In operation, processor 52 executes block manager application 64 in order to map one or more logical volumes (not shown) to physical storage regions 66 on storage devices 50.

In addition to HBA 28, host computer 22 comprises a host processor 68 and a host memory 70 that stores file system write cache 60 and a file system manager application 72. In operation, host processor 68 executes file system manager application 72 in order to map files such as a reserved file 74 to the logical volumes mapped by block manager application 64. Use of reserved file 74 is described in the description referencing FIG. 4 hereinbelow.

File system manager 72 typically operates in asynchronous mode. In other words, when host processor 68 receives a data write request for a given volume, the host processor confirms completion of the write operation upon saving the data to the file system write cache. In embodiments of the present invention, as explained hereinbelow, processor 68 can grow and shrink file system write cache 60 based on the number of available storage regions 66. While there are still available storage regions 66, file system manager 72 can still operate in asynchronous mode. However, if there are no available storage regions 66, file system 72 operates in synchronous mode. If file system manager 72 is operating in synchronous mode, the file system confirms completion of a write operation only upon receiving a completion confirmation from block manager application 64.

While the configuration in FIG. 2 shows storage processor 52 executing block manager application 64 and host processor 68 executing file system manager 72, embodiments where the block manager and the file system manager are executed by processor 52 or 68 (i.e., a single processor) are considered to be within the spirit and scope of the present invention.

Processors 52 and 68 comprise general-purpose central processing units (CPU) or special-purpose embedded processors, which are programmed in software or firmware to carry out the functions described herein. The software may be downloaded to modules 36 and host computers 22 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Dynamic Write Cache Resizing

Figure 3:
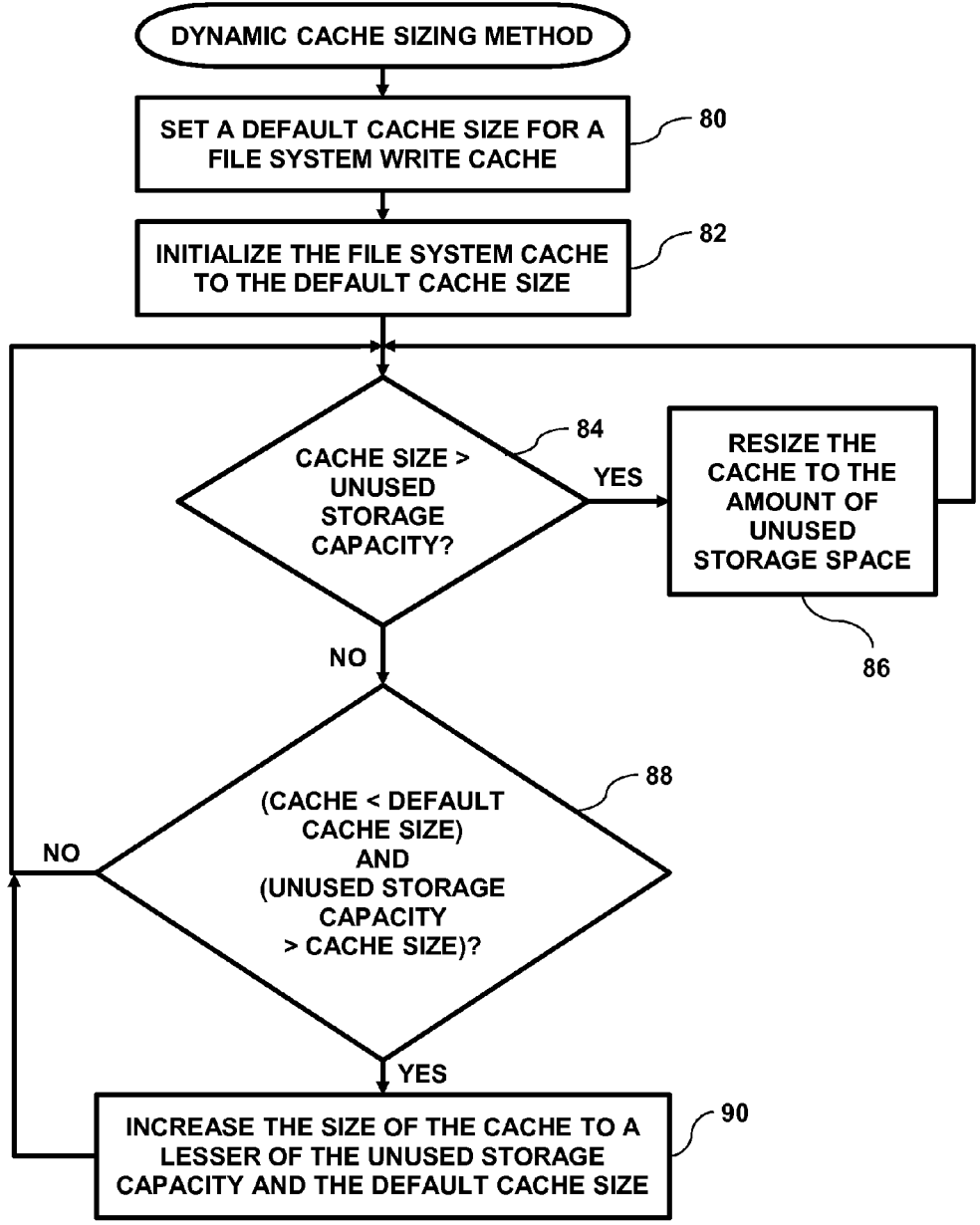
FIG. 3 is a flow diagram that schematically illustrates a method of dynamically controlling the size of the file system write cache, in accordance with an embodiment of the preset invention.

FIG. 3 is a flow diagram that schematically illustrates a method of dynamically controlling the size of file system write cache 60, in accordance with a first embodiment of the preset invention. Processor 68 can perform the steps described in the flow diagram can be performed as a separate process (or thread) while the host file system manager 72 is destaging data from file system write cache 60 to block manager 64.

In a sizing step 80, processor 68 sets a default cache size for file system write cache 60, and in an initialization step 82, the host processor initializes the file system write cache to the default cache size. In embodiments of the present invention, the default cache size typically corresponds to a first storage capacity of a default number of storage regions 66.

Upon initializing file system write cache 60, processor 68 can utilize the file system write cache to process data write requests. As described supra, when processing a data write request from a client computer (not shown), processor 68 confirms completion of the data write request upon storing the write request's data to file system write cache 60. In operation, file system transfers write request data from file system write cache 60 to block manager 64, which first stores the write request data to block cache 40, and then destages the write request data from the block cache to one or more storage regions 66.

In embodiments of the present invention, processor 68 keeps track (i.e., determines) a current number of storage regions 66 that are currently available (i.e., not storing data) by block manager 64. Additionally, while processor 68 initially sets a default cache size of file system write cache 60, the host processor can change the size of the file system write cache, as explained hereinbelow.

In a first comparison step 84, if processor 68 determines that the current size of file system write cache 60 is greater number of available storage regions 66 (i.e., the physical storage regions not being used by block manager 64), then in a first resizing step 86, the host processor resizes the file system write cache to the current size of the available storage regions 66, and the method continues with step 84. Reducing the size of file system write cache ensures that while processing data write requests, file system manager 72 can still operate in asynchronous mode as long as there are still storage regions 66 not being used by block manager 64.

However, when there are zero available storage regions 66, the size of file system write cache 60 is also zero, and file system manager 72 operates in synchronous mode. While in synchronous mode, file system manager 72 confirms completion of a data write request only upon receiving a confirmation from block manager 64 that processor 52 successfully destaged the write request's data to storage region(s) 66.

While the size of file system write cache 60 is less than the default cache size, processor 68 can monitor block manager 64 to see if any storage regions 66 become available. Storage regions 66 can become available if block manager 64 releases one or more of the storage regions (e.g., if a file is deleted), or if an additional storage device 50 is added to system 20. Returning to step 84, if the current size of file system write cache 60 is less than or equal to the number of available storage regions 66, then in a second comparison step 88, if the size of file system write cache 60 is less than the default cache size and the unused storage capacity (i.e., the storage capacity of one or more storage regions 66 not currently in use by block manager 64) is greater than the current size of the file system write cache, then in a second resizing step 90, the host processor resizes the file system write cache to the lesser of the unused storage capacity and the default cache size (i.e., the maximum size of the file system write cache is the default cache size), and the method continues with step 84.

Returning to step 88, if the size of file system write cache 60 is greater equal to the default cache size, then the method continues with step 84.

Figure 4:
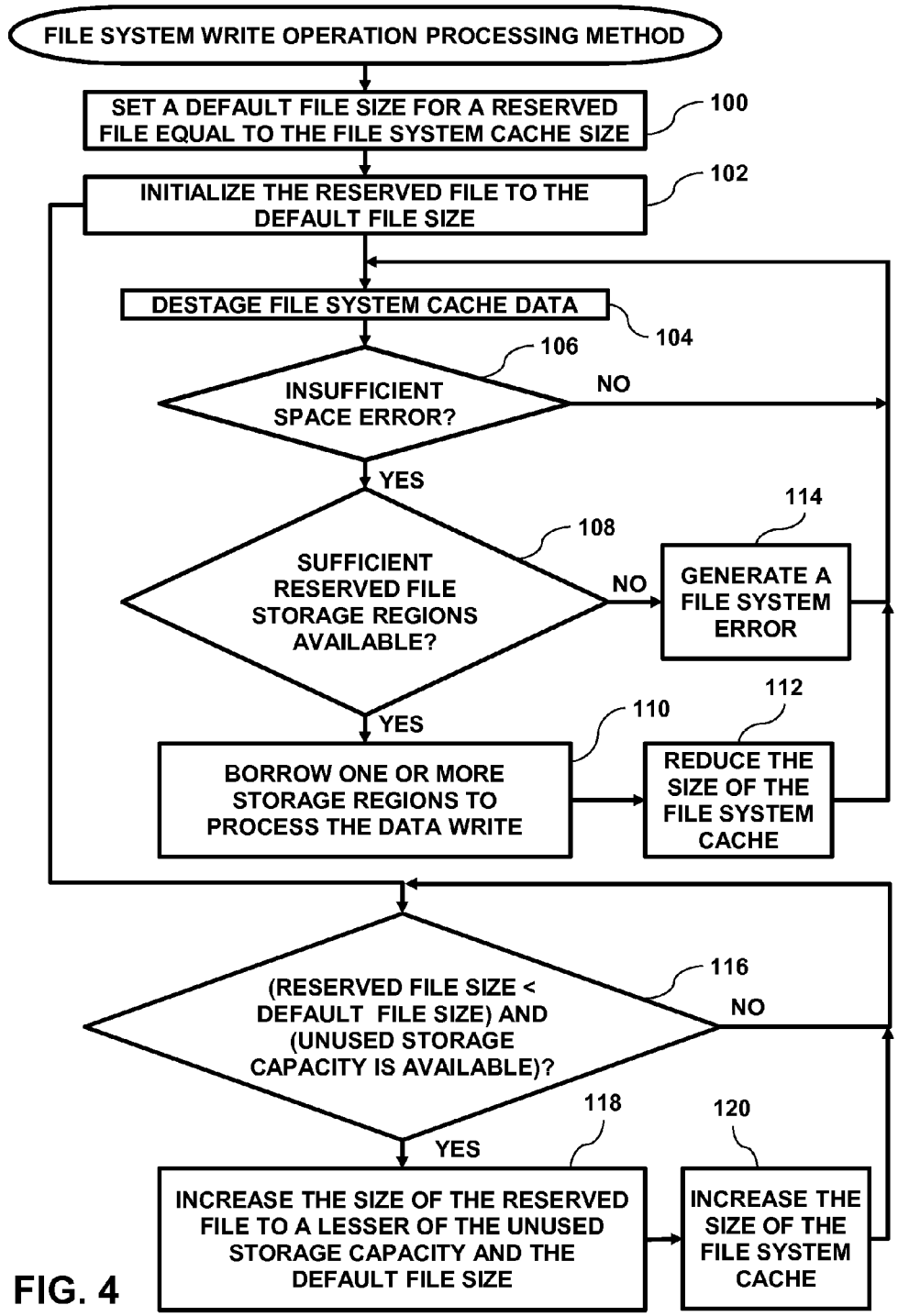
FIG. 4 is a flow diagram that schematically illustrates a method of processing write operations while dynamically controlling the size of the file system write cache, in accordance with an embodiment of the preset invention.

FIG. 4 is a flow diagram that schematically illustrates a method of processing write operations while dynamically controlling the size of file system write cache 60, in accordance with a first embodiment of the preset invention. In a sizing step 100, processor 68 sets a default file size for reserved file 74, and in an initialization step 102, the host processor initializes the reserved file to default file size comprising multiple storage regions 66. The default file size is typically in accordance with the default cache size of file system write cache 60. In some embodiments, processor 68 can fill the storage regions in reserved file 74 with incompressible data.

In the example shown in the flow diagram, upon completing step 102, processor 68 executes steps 104-114 and steps 116-120 simultaneously as two separate threads. As described hereinbelow, in a first thread comprising steps 104-114, processor 68 destages data from file system write cache 60 to block manager 64, and reduces the size of reserved file 74 as necessary, and in a second thread comprising steps 116-120, while the size of the reserved file is less than the default file size, processor 68 monitors the available number of storage regions 66, and increases the size of the reserved file when one or more of the storage regions become available.

Once processor 68 initializes reserved file 74, the host processor can start processing data write requests, and execute the first thread to start destaging data from file system write cache 60 to block manager 64. In a destaging step 104, processor 68 attempts to destage data from file system write cache 60 to block manager 64. Attempting to destage data from file system write cache 60 to block manager 64 is also referred to herein as a data destage attempt.

In a first comparison step 106, if processor 68 receives an insufficient space (e.g., "ENOSPC") error from block manager 64 in response to the destaging attempt, then in a second comparison step 108, the host processor determines if there are sufficient storage regions 66 to perform the data destaging that are currently allocated to reserved file 74. In embodiments of the present invention, processor 68 can detect that the current number of unused (available) storage regions 66 is less than the default number of the storage regions by receiving the insufficient space error in step 106.

If there are sufficient storage regions 66 in reserved file 74 to complete the data destaging attempt, then processor 68 processor 68 "borrows" one or more of the storage regions in the reserved file in order to complete the data destaging in a borrowing step 110, reduces the size of the file system write cache in a first cache resizing step 112, and the method continues with step 104. Processor 68 typically reduces the size of file system write cache 60 by the amount of storage space borrows from reserved file 74.

To borrow the one or more storage regions, file system manager 72 can delete the one or more storage regions from reserved file 74, thereby returning the one or more storage regions to block manager 64, which can then use the returned storage region(s) to complete the data destaging. In some embodiments, upon receiving the insufficient space error (in step 106) and returning the one or more storage regions to block manager 64 (in step 110), file system manager 72 can convey a message to the block manager to perform the destaging (i.e., from step 104) a second time.

Returning to step 108, if there are not sufficient storage regions 66 in reserved file 74 to complete the data destaging, then in an error step 114, file system manager 72 conveys an insufficient space file system error in response to the data destaging attempt, and the method continues with step 104.

Returning to step 106, if file system manager 72 does not receive an insufficient space error from block manager 64 in response to destaging in step 104, then the method continues with step 104.

The second thread starts with a third comparison step 116. In step 116, if the size of reserved file 74 is less than the default file size and if there is unused storage capacity on storage devices 50 comprising storage regions 66 currently not being used by block manager 64, then, processor 68 increases the size of the reserved file to a lesser of the unused storage capacity and the default file size in a file resizing step 118, increases the size of file system write cache 60, and the method continues with step 116. Processor 68 typically increases the size of file system write cache by the same amount of storage space added to the reserved file in step 118.

Returning to step 116, if the size of reserved file 74 is less than the default file size, then the method continues with step 116. In other words, when the size of reserved file 74 is less than the default file size, file system manager 72 monitors storage regions 66 to see if any of the storage regions become available, and upon detecting an available (i.e., unused) storage region 66, the file system manager increases the size of the reserved file (up to a maximum of the default file size), thereby utilizing the available storage region.

As described in steps 116-120 hereinabove, if the size of reserved file 74 is less than the default file size, then file system manager 72 can increase the size of the reserved file as the file system manager releases one or more storage regions 66. An example of releasing one or more storage regions 66 comprises file system 72 deleting a file on storage devices 50. In a first embodiment, upon deleting the file, file system manager 72 can add the one or more released storage regions 66 to reserved file 74. In a second embodiment, file system manager 72 can "return" the released one or more storage regions 66 to block manager 64 by conveying, to the block manager, a notification indicating the release. In the second embodiment, upon returning the one or more storage regions to block manager 64, file system manager 72 can increase the size of reserved file 74 by conveying a storage region allocation request to the block manager.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    initializing, by a processor executing a file system in communication with a block manager managing multiple storage regions on a storage device, a file system write cache to have a default cache size, the default cache size corresponding to a first storage capacity of a default number of the storage regions;
    determining a current number of the storage regions that are not in use by the block manager;
    upon detecting that the current number is less than the default number, resizing the file system write cache to a reduced cache size that corresponds to a second storage capacity of the current number of the storage regions; and
    determining, while the file system write cache has the reduced cache size, a subsequent number of the storage regions that are not in use by the file system, and upon detecting that the subsequent number is greater than the current number, resizing the file system write cache to an expanded cache size that corresponds to a third storage capacity comprising a lesser of the subsequent number of the storage regions and the first storage capacity.

2. The method according to claim 1, wherein initializing the file system write cache comprises defining, on the storage device, a reserved file comprising the default number of the storage regions.

3. The message according to claim 2, wherein detecting that the current number of the storage regions is less than the default number comprises attempting, by the file system, a data destage to the block manager, and receiving, from the block manager, an insufficient space error in response to the data destage attempt.

4. The message according to claim 3, and comprising upon resizing the file system write cache to the reduced cache size, borrowing, by the file system, one or more of the storage regions in the reserved file in order to complete the data destage.

5. The method according to claim 4, and comprising upon resizing the file system write cache to an expanded cache size, adding one or more of the storage regions to the reserved file, thereby resizing the file to the third storage capacity.

6. The method according to claim 5, and comprising releasing, by the file system, one or more of the multiple storage regions, and performing an operation selected from a list consisting of adding the one or more released storage regions to the reserved file and conveying a notification to the block manager indicating the release.

7. An apparatus, comprising:
    a storage device;
    a memory configured to store a file system write cache; and
    a processor configured:
        to execute a block manager configured to manage multiple storage regions on the storage device; and
        to execute a file system manager configured:
            to initialize the file system write cache to have a default cache size, the default cache size corresponding to a first storage capacity of a default number of the storage regions;
            to determine a current number of the storage regions that are not in use by the block manager;
            upon detecting that the current number is less than the default number, to resize the file system write cache to a reduced cache size that corresponds to a second storage capacity of the current number of the storage regions; and
            to determine, while the file system write cache has the reduced cache size, a subsequent number of the storage regions that are not in use by the file system, and upon detecting that the subsequent number is greater than the current number, to resize the file system write cache to an expanded cache size that corresponds to a third storage capacity comprising a lesser of the subsequent number of the storage regions and the first storage capacity.

8. The apparatus according to claim 7, wherein the processor is configured to initialize the file system write cache by defining, on the storage device, a reserved file comprising the default number of the storage regions.

9. The apparatus according to claim 8, wherein the processor is configured to detect that the current number of the storage regions is less than the default number by attempting, by the file system, a data destage to the block manager, and receiving, from the block manager, an insufficient space error in response to the data destage attempt.

10. The apparatus according to claim 9, wherein upon resizing the file system write cache to the reduced cache size, the processor is configured to borrow one or more of the storage regions in the reserved file in order to complete the data destage.

11. The apparatus according to claim 10, wherein upon resizing the file system write cache to an expanded cache size, the processor is configured to add one or more of the storage regions to the reserved file, thereby resizing the file to the third storage capacity.

12. The apparatus according to claim 11, wherein the processor is configured to release one or more of the multiple storage regions, and to perform an operation selected from a list consisting of adding the one or more released storage regions to the reserved file and conveying a notification to the block manager indicating the release.

13. A computer program product, the computer program product comprising:
  a non-transitory computer readable storage medium having computer readable program code embodied therewith, the computer readable program code comprising:
  computer readable program code configured to initialize, by a processor executing a file system in communication with a block manager managing multiple storage regions on a storage device, a file system write cache to have a default cache size, the default cache size corresponding to a first storage capacity of a default number of the storage regions;
  computer readable program code configured to determine a current number of the storage regions that are not in use by the block manager;
  computer readable program code configured upon detecting that the current number is less than the default number, to resize the file system write cache to a reduced cache size that corresponds to a second storage capacity of the current number of the storage regions; and
  computer readable program code configured to determine, while the file system write cache has the reduced cache size, a subsequent number of the storage regions that are not in use by the file system, and upon detecting that the subsequent number is greater than the current number, to resize the file system write cache to an expanded cache size that corresponds to a third storage capacity comprising a lesser of the subsequent number of the storage regions and the first storage capacity.

14. The computer program product according to claim 13, wherein the computer readable program code is configured to initialize the file system write cache by defining, on the storage device, a reserved file comprising the default number of the storage regions.

15. The computer program product according to claim 14, wherein the computer readable program code is configured to detect that the current number of the storage regions is less than the default number by attempting, by the file system, a data destage to the block manager, and receiving, from the block manager, an insufficient space error in response to the data destage attempt.

16. The computer program product according to claim 15, and comprising computer readable program code configured, upon resizing the file system write cache to the reduced cache size, to borrow, by the file system, one or more of the storage regions in the reserved file in order to complete the data destage.

17. The computer program product according to claim 16, and comprising computer readable program code configured, upon resizing the file system write cache to an expanded cache size, to add one or more of the storage regions to the file, thereby resizing the reserved file to the third storage capacity.

* * * * *